United States Patent [19]

Ueno

[11] Patent Number: 4,577,718
[45] Date of Patent: Mar. 25, 1986

[54] APPARATUS FOR CONTROLLING THE SPEED OF A VEHICLE WITH INTERNAL COMBUSTION ENGINE

[75] Inventor: Masahito Ueno, Higashimatsuyama, Japan

[73] Assignee: Diesel Kiki Co., Ltd., Japan

[21] Appl. No.: 606,699

[22] Filed: May 3, 1984

[30] Foreign Application Priority Data

May 4, 1983 [JP] Japan .................................. 58-77570

[51] Int. Cl.⁴ ............................................. B60K 31/04
[52] U.S. Cl. .................................... 180/179; 123/352; 123/361
[58] Field of Search .............. 180/179, 178, 171, 10 S; 123/352, 102, 361, 360, 350, 349, 333, 369

[56] References Cited

U.S. PATENT DOCUMENTS 4,301,883 11/1981 Collonia .............................. 180/179
4,337,839  7/1982 Taplin ................................. 180/179

Primary Examiner—Henry Bennett
Attorney, Agent, or Firm—Guy W. Shoup

[57] ABSTRACT

In an apparatus for controlling the speed of a vehicle driven by an internal combustion engine so as to maintain the vehicle speed at a target vehicle speed, the apparatus has a load detector for detecting the load condition of the engine at each instant and the PID control characteristics for the engine speed control are changed in accordance with the result detected by the load detector whereby the actual vehicle speed is maintained at the desired speed with high response characteristics.

8 Claims, 3 Drawing Figures

APPARATUS FOR CONTROLLING THE SPEED OF A VEHICLE WITH INTERNAL COMBUSTION ENGINE

BACKGROUND OF THE INVENTION

The present invention relates to an apparatus for controlling the speed of a vehicle with an internal combustion engine, more particularly to a vehicle speed control apparatus by which the speed of a vehicle having an electronically controlled internal combustion engine is controlled so as to maintain a predetermined speed.

In prior art, a number of vehicle speed control apparatuses have been proposed in which the amount of fuel supplied to an internal combustion engine such as a diesel engine, gasoline engine or the like is regulated so as to control the speed of the vehicle having the engine at a desired constant speed. Such an apparatus is required to change the control condition in accordance with the condition of engine operation in order to carry out satisfactory vehicle speed control. For example, as disclosed in Japanese Utility Model Public Disclosure No. 57-14212, a vehicle speed control apparatus has been proposed in which a vehicle speed pulse with a frequency corresponding to the vehicle speed is converted into a voltage signal by a frequency-voltage converter, the conversion gain is changed in accordance with a predetermined level by the use of a changing circuit, whereby the gain of the control loop is changed in accordance with the vehicle speed.

However, since the apparatus gives no consideration to increases in engine load which occur, for example, during hill climbing and takes account of only the vehicle speed, it is difficult to attain satisfactory vehicle speed control. That is, in order to control the vehicle speed with good response characteristics, it is necessary to increase the gain of the control loop when the engine load increases. However, in the conventional apparatus, the control characteristics are insufficient since no consideration is given to this point.

SUMMARY OF THE INVENTION

It is therefore an object of the present invention to provide an improved apparatus for controlling the speed of a vehicle with an internal combustion engine, wherein optimum control characteristics can be established in consideration of the load condition of the engine.

It is another object of the present invention to provide an apparatus for controlling the speed of a vehicle with an internal combustion engine, wherein a control constant for a vehicle speed control circuit is selected in accordance with at least the engine load, so that optimum vehicle speed control for the condition of engine operation at each instant can be carried out.

According to the present invention, in an apparatus for controlling the speed of a vehicle driven by an internal combustion engine so as to maintain the vehicle speed at a target vehicle speed, the apparatus has means for generating a first signal relating to the target vehicle speed, means for generating a second signal relating to the actual vehicle speed at each instant, means for producing a load signal relating to the load of the internal combustion engine and a deviation detecting means responsive to the first and the second signals for producing a third signal indicative of the deviation of the actual vehicle speed from the target vehicle speed. To carry out PID (Proportional, Integrational and Differential) control of the speed of the engine in accordance with desired PID control characteristics dependent on the load signal, a control signal subjected to desired signal processing in response to the load signal and the third signal is derived from a signal generating means and the speed of the internal combustion engine is controlled in accordance with the control signal, whereby the actual vehicle speed is maintained at the target vehicle speed with high response characteristics.

The desired PID control characteristics may also be determined taking into account the second signal in addition to the third signal and the determination thereof may be carried out by a map calculation using a read only memory (ROM). That is, in a preferred embodiment, the load and second signal are applied to a read only memory in which a number of data showing various PID control characteristics have been stored in advance, and desired data is read out from the read only memory in response to the load and the second signal.

With this structure, when the load condition of the vehicle changes, the PID control characteristics are changed in response to the change in the load condition to decrease or increases the control variable. Therefore, it is possible to carry out a control operation for maintaining the vehicle speed at a desired constant level that takes the torque performance of the engine into account and is matched to the condition of the engine at each instant. Consequently, even when the engine is operating under heavy load as during hill climbing, it is still possible to carry out the control operation for maintaining the vehicle speed at a desired constant speed with excellent response.

The invention will be better understood and the other objects and advantages thereof will be more apparent from the following detailed description of a preferred embodiment with reference to the accompanying drawings.

DESCRIPTION OF THE PREFERRED EMBODIMENTS

Figure 1:
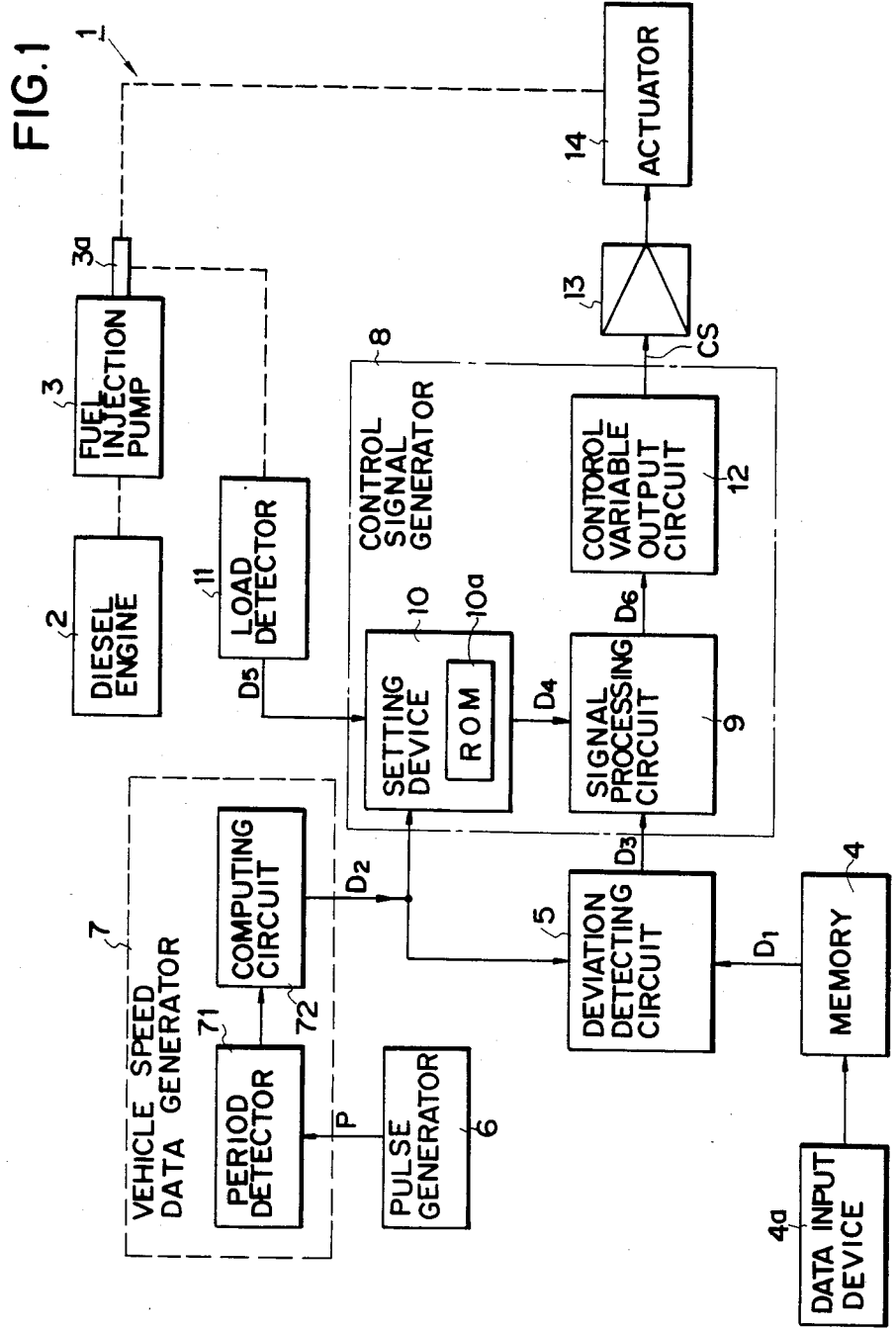
FIG. 1 is a block diagram illustrating an embodiment of the vehicle speed controlling apparatus of the present invention.

FIG. 1 shows a block diagram of an embodiment of the apparatus for controlling vehicle speed of the present invention. A vehicle speed controlling apparatus 1 controls the position of a control rack 3a of a fuel injection pump 3 for supplying fuel to a diesel engine 2 and in this way controls the speed of the diesel engine 2 in such manner that the speed of the vehicle (not shown) driven by the diesel engine 2 is maintained at a desired target vehicle speed.

Data indicating the target vehicle speed is stored in a memory 4 by a data input device 4a and a first data $D_1$ indicative of the target vehicle speed is read out from the memory 4 and applied to one input terminal of a deviation detecting circuit 5. For detecting the actual vehicle speed at each instant, there is provided a pulse generator 6 for generating a pulse train signal P whose period varies in accordance with the actual vehicle speed. The pulse generator 6 is provided in association with the propeller shaft (not shown) and the pulse train signal P is applied to a vehicle speed data generator 7. The vehicle speed data generator 7 has a period detector 71 for detecting the period of the pulse train signal P and a computing circuit 72 for computing and producing a second data $D_2$ indicative of the actual vehicle speed in response to the output from the period detector 71. The second data $D_2$ is applied to another input terminal of the deviation detecting circuit 5, which produces a third data $D_3$ representing the deviation of the actual vehicle speed from the target vehicle speed.

The third data $D_3$ is applied to a control signal generator 8 which produces a control signal CS on the basis of the third data $D_3$, and the amount of fuel injected is controlled in PID control mode in accordance with the control signal CS.

The control signal generator 8 has a signal processing circuit 9 for carrying out signal processing on the third data $D_3$ as required for carrying out the proportional, integral and differential control (PID control) on the basis of the third data. The PID control characteristics effected by the signal processing circuit 9 are determined by a fourth data $D_4$. The fourth data $D_4$ represents a set of PID control constants consisting of a proportional constant, an integration constant and a differential coefficient, and are derived from a setting device 10.

To determine the PID control constants on the basis of the engine load and the vehicle speed, the second data $D_2$ and a load data $D_5$, obtained from a load detector 11 and indicative of the engine load at each instant, are applied to the setting device 10. The load detector 11 is a position sensor for detecting the position of the control rack $3a$ and the load data $D_5$ produced thereby represents the position of the control rack $3a$ at each instant.

The setting device 10 includes a reading only memory (ROM) $10a$ in which many sets of PID control constants are stored. The second data $D_2$ and the load data $D_5$ are applied to the ROM $10a$ as address data. As a result, the data stored at the address designated by these data $D_2$ and $D_5$ is read out as data representing the optimum PID control constants for the condition of vehicle operation at that time, and the data read out is applied to the signal processing circuit 9.

The data to be stored at each address designated by the data $D_2$ and $D_5$ as providing optimum control for the conditions represented by the data $D_2$ and $D_5$ can be determined experimentally.

The structure of the setting device 10 is not limited to that of the above described device in which map calculation is carried out in response to the data $D_2$ and $D_5$ to obtain the optimum PID control constants for the operating condition at that time, but may be arranged so that the optimum PID control constants are obtained by computations based on the data $D_2$ and $D_5$.

After the third data $D_3$ has been subjected to the data processing by the signal processing circuit 9 in accordance with data $D_4$ obtained as described above, PID control data $D_6$ is derived from the signal processing circuit 9 and applied to a control variable output circuit 12 for producing the control signal CS. The control signal CS is amplified by an amplifier 13 and then is applied to an actuator 14 connected with the control rack $3a$.

The control rack $3a$ is moved in response to the control signal CS in such a way that the deviation indicated by data $D_3$ becomes zero. As a result, the vehicle speed is controlled so as to be maintained at the desired vehicle speed indicated by the data $D_1$ from the memory 4.

With this circuit structure, since the PID control constants vary in accordance with the load condition of the vehicle or engine, the control variable is adjusted in response to the load condition, so that it is possible to realize optimum control for maintaining the vehicle speed at a desired constant speed. In particular, as shown in the embodiment, in the case where the PID control constants can be set on the basis of two parameters, namely the vehicle speed and the load, it is possible to realize optimum control for the condition of the engine operation at each instant in a manner that takes the torque performance into account.

Figure 2:
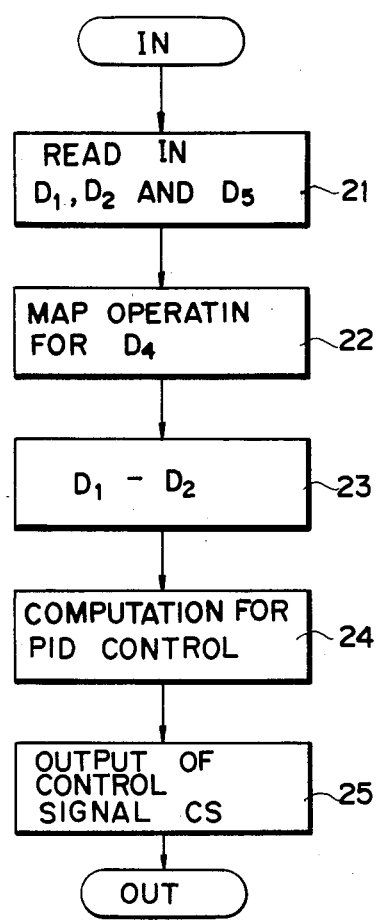
FIG. 2 is the flow chart of a control program used when a deviation detecting circuit and a control signal generator are replaced by a microcomputer.

The functions of the deviation detecting circuit 5 and the control signal generator 8 shown in FIG. 1 can also be realized by employing a microcomputer. The flow chart of an example of a program which can be used in this case is shown in FIG. 2. This program may, for example, be executed in the course of executing a main program for the control of the fuel injection pump by a microcomputer built in a main control device (not shown) for electronically controlling the fuel injection pump 3.

At first, in step 21, the first data $D_1$, the second data $D_2$ and the load data $D_5$ are read in and then a map operation for obtaining the data $D_4$ indicating the PID control characteristics is executed in step 22 on the basis of data $D_2$ and $D_5$. After the execution of step 22, the deviation of the actual vehicle speed from the target vehicle speed is computed on the basis of the difference between the data $D_1$ and the data $D_2$ in step 23, and the computation for the PID control is carried out for the deviation represented by the data $D_4$ obtained by step 22 (step 24). Finally, in step 25, the control variable is computed on the basis of the result obtained in step 24 and the control signal CS is output.

Figure 3:
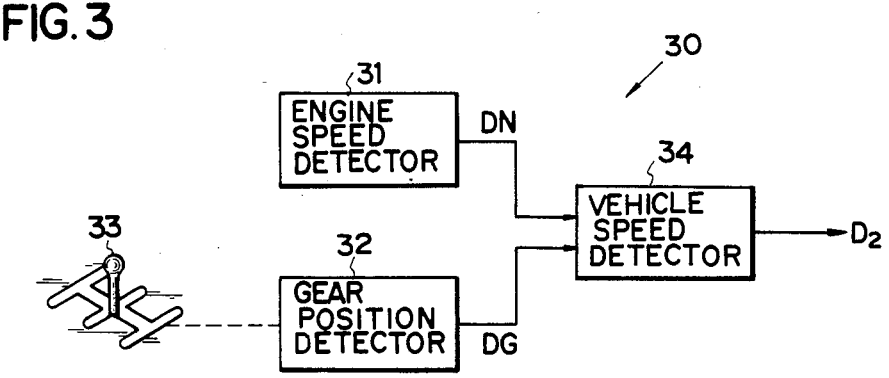
FIG. 3 is a block diagram illustrating another circuit arrangement for producing data showing vehicle speed.

Although, as shown in FIG. 1, the data $D_2$ concerning the vehicle speed is obtained by directly utilizing a signal from a pulse generator which is, for example, provided in association with the propeller shaft, the data $D_2$ may instead be obtained on the basis of the engine speed and the position of the gear change lever. FIG. 3 shows another block diagram of a circuit for producing the data $D_2$. A data generator 30 for generating the data $D_2$ representing the actual vehicle speed has an engine speed detector 31 for generating a data $D_N$ indicative of the actual engine speed and a gear position detector 32 for generating a data $D_G$ indicative of the position of the gear change lever 33, and data $D_N$ and $D_G$ are applied to a vehicle speed detector 34 to compute the actual vehicle speed on the basis of the engine speed shown by data $D_N$ and the position of the gear change lever 33. The result computed by the vehicle speed detector 34 is output as the second data $D_2$.

With this arrangement, since the engine speed can be detected with higher accuracy than the propeller shaft speed, the vehicle speed can be determined more accurately.

Although the present invention has been described in relation to a diesel engine, it can also be applied to a vehicle with a gasoline engine in a similar manner as described above.

I claim:

1. A vehicle speed controlling apparatus for controlling the speed of an internal combustion engine with PID control to maintain the speed of a vehicle driven by the internal combustion engine at a desired target vehicle speed, said apparatus, comprising:
   means for generating a first signal indicative of the desired target vehicle speed;
   means for generating a second signal relating to the actual vehicle speed at each instant;
   means for producing a load signal relating to the load of the internal combustion engine;
   a deviation detecting means responsive to the first and second signals for producing a third signal indicative of the deviation of the actual vehicle speed from the target vehicle speed;
   a signal generating means responsive to at least the load signal and the third signal for generating a control signal which has been signal processed in such a way that PID control of the speed of the internal combustion engine can be carried out in accordance with desired PID control characteristic dependent upon at least the load signal; and
   means responsive to the control signal for driving a speed adjusting member of the internal combustion engine so as to maintain the actual vehicle speed at the target vehicle speed.

2. An appartus as claimed in claim 1, wherein said means for generating the second signal includes means for generating a speed signal representing the actual engine speed, means for generating a gear signal indicating the gear position at each instant, and means responsive to the speed signal and the gear signal for producing a signal indicating the vehicle speed at each instant as the second signal.

3. An apparatus as claimed in claim 1, wherein said signal generating means for generating a control signal has a setting means responsive to at least the load signal for producing a setting signal representing desired PID control characteristics for the PID control, a signal processing means processes the third signal as required for obtaining the desired PID control characteristics in response to the third signal and the setting signal, and means for producing an output signal representing a control variable based on the output from said signal processing means as the control signal.

4. An apparatus as claimed in claim 3, wherein the second signal is further applied to said setting means and the setting signal is produced in response to the load signal and the second signal.

5. An apparatus as claimed in claim 3, wherein said setting means has a memory storing a number of data representing various PID control characteristics therein and a desired data corresponding to the load signal is read out as the setting signal representing the PID control characteristics upon application of the load signal to the memory as an address signal.

6. An apparatus as claimed in claim 4, wherein said setting means has a memory storing a nummber of data representing various PID control characteristics therein and a desired data corresponding to the load signal and the second signal is read out as the setting signal representing PID control characteristics upon application of the load signal and the second signal to the memory as an address signal.

7. An apparatus as claimed in claim 1, wherein the internal combustion engine is a diesel engine, and the position of a fuel adjusting member of a fuel injection pump is adjusted in response to the control signal, whereby the vehicle speed is controlled.

8. An apparatus as claimed in claim 1, wherein the functions of said deviation detecting means and said signal generating means are carried out by execution of a program stored in a microcomputer.

* * * * *